(12) United States Patent
Brown et al.

(10) Patent No.: US 9,458,395 B2
(45) Date of Patent: Oct. 4, 2016

(54) CATALYSTS FOR HYDRODESULFURIZATION

(71) Applicant: GOVERNORS OF THE UNIVERSITY OF ALBERTA, Edmonton (CA)

(72) Inventors: Houston J. S. Brown, Edmonton (CA); Jeffrey Mark Stryker, Edmonton (CA); Dominque M. Hebert, Edmonton (CA)

(73) Assignee: Governors of the University of Alberta (CA)

(*) Notice: Subject to any disclaimer, the term of this patent is extended or adjusted under 35 U.S.C. 154(b) by 673 days.

(21) Appl. No.: 13/899,332

(22) Filed: May 21, 2013

(65) Prior Publication Data

US 2014/0346087 A1    Nov. 27, 2014

(51) Int. Cl.
| | | |
|---|---|---|
| *C10G 45/06* | (2006.01) | |
| *C10G 45/36* | (2006.01) | |
| *B01J 31/18* | (2006.01) | |
| *B01J 31/00* | (2006.01) | |
| *C10G 67/04* | (2006.01) | |

(52) U.S. Cl.
CPC ............ *C10G 45/06* (2013.01); *B01J 31/00* (2013.01); *B01J 31/189* (2013.01); *C10G 45/36* (2013.01); *C10G 67/04* (2013.01)

(58) Field of Classification Search
CPC ............................. C10G 45/06; C10G 45/36
See application file for complete search history.

(56) References Cited

U.S. PATENT DOCUMENTS

| 6,239,061 B1 | 5/2001 | Wang et al. |
| 6,846,769 B2 | 1/2005 | Arndt-Rosenau et al. |

FOREIGN PATENT DOCUMENTS

| CA | 2605077 | 4/2009 |
| EP | 0881233 | 12/1998 |
| EP | 0890581 | 1/1999 |
| WO | WO 00/05236 | 2/2000 |
| WO | WO 00/05238 | 2/2000 |
| WO | WO 01/19512 | 3/2001 |
| WO | WO 2009/043156 | 4/2009 |
| WO | WO 2009/043157 | 4/2009 |

OTHER PUBLICATIONS

U.S. Appl. No. 13/899,262, filed May 21, 2013, Brown et al.
Chianelli et al., "Unsupported transition metal sulfide catalysts: 100 years of science and application," Catalysis Today, 2009, vol. 147, Iss. 3-4, pp. 275-286.
Dehnicke et al., "Phosphoraneiminato complexes of transition metals," Coordination Chemistry Reviews, 1999, vol. 182, Iss. 1, pp. 19-65.
Duchet et al., "Carbon-Supported Sulfide Catalysts," Journal of Catalysis, 1983, vol. 80, Iss. 2, pp. 386-402.
Evans, "The determination of the paramagnetic susceptibility of substances in solution by nuclear magnetic resonance," Journal of the Chemical Society (Resumed), 1959, pp. 2003-2005.
Guérin et al., "Synthesis, Structure, and Reactivity of the Phosphinimide Complexes (t-Bu$_3$PN)nMX4-n (M = Ti, Zr)," Organometallics, 2000, vol. 19, Iss, 16, pp. 2994-3000.
Klien et al., "Novel Imido- and Phosphorane-Imido-Nickel(11) Complexes. Crystal and Molecular Structure of ($\mu_3$-NH)($\mu_3$-NPMe$_3$)(NiClPMe$_3$)$_3$," Journal of the American Chemical Society, 1991, vol. 113, pp. 4673-4675.
Mast et al., "Vinyl-type polymerization of norbornene by a nickel-based catalyst with phosphoraneiminato ligands," Macromolecular Rapid Communications, 1999, vol. 20, Iss. 4, pp. 232-235.
Ramos et al., "Titanium ferrocenyl-phosphinimide complexes," Dalton Transactions, 2010, vol. 39, Iss. 5, pp. 1328-1338.
Riese et al., Cobalt(II)-organische Phosphaniminato-Komplexe mit Heterocuban-Struktur. Kristallstrukturen von [CoBr(NPR$_3$)]$_4$ mit R = Me, Et, [Co(C≡C-CMe$_3$)(NPMe$_3$)]$_4$ und [Co(C≡C-SiMe$_3$)(NPEt$_3$)]$_4$, Zeitschrift für anorganische und allgemeine Chemie (Journal of Inorganic and General Chemistry), 1998, vol. 624, Iss. 8, pp. 1279-1284.
Schroers et al., "Grafting of Vinyl-Type Polynorbornene on Polybutadiene and Polyisoprene," Macromolecular Chemistry and Physics, 2002, vol. 203, Iss. 18, pp. 2658-2664.
Vissers et al., "The Role of Co in Sulphidised Co-Mo Hydrodesulphurisation Catalysts supported on Carbon and Alumina," Journal of the Chemical Society, Faraday Transactions 1: Physical Chemistry in Condensed Phases, 1987, vol. 83, Iss. 7, pp. 2145-2155.
Yadav et al., "Phosphinimide complexes with pendant hemilabile donors: synthesis, structure and ethylene polymerization activity," Dalton Transactions, 2009, Iss. 9, pp. 1636-1643.

*Primary Examiner* — Renee E Robinson
(74) *Attorney, Agent, or Firm* — Sheridan Ross P.C.

(57) ABSTRACT

Phosphoranimide-metal catalysts and their role in hydrodesulfurization and hydrogenation are disclosed. The catalysts comprise of first row transition metals such as nickel, cobalt and iron. The catalysts have a metal to anionic phosphoranimide ratio of 1:1 and have no inactive bulk phase and no dative ancillary ligands. In one embodiment, the catalysts comprise discrete mixed-valent precatalyst clusters, the electronic state of which can be adjusted to optimize catalytic activity. The catalysts catalyze the hydrodesulfurization of a range of sulfur-containing organic compounds under lower temperature and pressure conditions than those conditions commonly used in industrial hydrodesulfurization. The catalysts also catalyze the hydrogenation of substrates comprising at least one carbon-carbon double bond which is not present in an aromatic moiety, although the substrate itself may include an aromatic moiety.

28 Claims, 3 Drawing Sheets

Structure of [MeCo(NPEt$_3$)]$_4$.

Structure of [McCo(NPEt₃)]₄PF₆.

Structure of [Fe(NP$^t$Bu$_3$)Br]$_2$.

CATALYSTS FOR HYDRODESULFURIZATION

FIELD

The disclosure relates to phosphoranimide-transition metal catalysts and the role of these catalysts in mediating hydrodesulfurization and hydrogenation of a range of organic compounds.

BACKGROUND

Transition metal catalysis remains a key enabling technology for the production of fuel. Petroleum upgrading processes, particularly hydrotreatment, involve the reductive cleavage of polar bonds such as carbon-sulfur and carbon-nitrogen bonds, processes commonly referred to as hydrodesulfurization (HDS) and hydrodenitrogenation (HDN), respectively. The efficient and complete removal of sulfur and nitrogen atoms is desired for the production of environmentally safe fuel because the combustion of sulfur- and nitrogen-containing components of petroleum results in increased emission of gaseous pollutants ($SO_x$ and $NO_x$) to the atmosphere.

Current hydrotreatment catalyst technologies are energy intensive (R. R. Chianelli et al. Catalysis Today 147 (2009) 275-286). This is due in part to the reaction conditions required for the metal catalysts to function. For example, cobalt- and nickel-promoted catalysts, such as $CoMoS_2$ and $NiWS_2$, generally function at high temperatures and high hydrogen pressures. These heterogeneous catalysts, in some cases, function at temperatures ranging from 300-650° C. and hydrogen pressures ranging from 90 to 120 atm or higher. The range of process conditions varies with catalyst formulation. These high temperature and high pressure conditions add to the refining costs of petroleum and crude oil. Hence, there remains a demand for cost-effective catalyst technologies for petroleum upgrading.

SUMMARY

According to one aspect, there is provided a method of catalyzing a hydrodesulfurization reaction comprising reacting an organic substrate having at least one carbon-sulfur bond with a catalyst of general formula:

   Formula I where:

A is a monoanionic σ-bonded ligand (e.g., hydrocarbyl, thiolate, alkoxide) that will undergo hydrogenolysis in the presence of hydrogen or hydrosilane;

M is a late transition first row transition metal;

n equals 2 to 4;

m equals 0, 1, 2, 3, 4 (up to a maximum of n);

Y is a weakly-coordinating or non-coordinating counter-ion, of formal negative charge 'd', and with stoichiometry 'e' such that d·e=m, and the charge of the counter-ion(s) offsets that of the cluster;

$R_3PN$ is an anionic phosphoranimide ligand of structure:

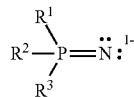

where:

$R^1$, $R^2$, $R^3$ can be the same group or different groups; $R^1$, $R^2$, $R^3$=alkyl (C1-18, primary, secondary and tertiary alkyl), cycloalkyl (C3-C8), aryl/heteroaryl, substituted aryl/heteroaryl or an inert functional group containing at least one heteroatom selected from the group consisting of a Group 15 and/or Group 16 element, and/or silicon; $R^1$, $R^2$, $R^3$ may also be linked to give cyclic systems, using linkages such as aliphatic cyclic systems; and wherein the M to R3PN⁻ ratio in the catalyst is 1:1.

The oxidation state of M is +2 or +3, depending on the value of m in the general formula.

In one embodiment, M is Fe, Co or Ni.

According to a second aspect, there is provided, a process for hydrodesulfurization of an organic substrate having at least one carbon-sulfur bond, the process comprising:

(i) combining the said organic substrate with a catalyst of Formula I as defined above and a reductant selected from hydrogen and an organic silyl hydride (hydrosilane) to obtain a reaction medium;

(ii) allowing the catalyst to catalyze the hydrodesulfurization of the substrate; and (iii) obtaining the desulfurized products derived from the organic substrate;

wherein the organic substrate is an aromatic or aliphatic compound containing at least one carbon-sulfur bond.

In one embodiment, the ratio of the catalyst to the organic substrate is less than about 1:1.

In another embodiment, the reaction is carried out at a catalyst-to-substrate ratio of about 1:1000 in toluene or tetrahydrofuran.

In one embodiment, the substrate is in the liquid phase. In another embodiment, the substrate may be dissolved in an organic hydrocarbon or ethereal solvent, typically selected from toluene and tetrahydrofuran.

In another aspect, there is provided a method for the hydrogenation of an unsaturated carbon-carbon bond, but not including an unsaturated carbon-carbon bond within an aromatic moiety, the method comprising reacting a substrate having at least one carbon-carbon unsaturated bond with a catalyst of general formula:

   Formula I where:

A is a monoanionic σ-bonded ligand (e.g., hydrocarbyl, thiolate, alkoxide) that will undergo hydrogenolysis in the presence of hydrogen or hydrosilane;

M is Fe, Co or Ni;

n equals 2 to 4;

m equals 0, 1, 2, 3, 4 (up to a maximum of n);

Y is a weakly-coordinating or non-coordinating counter-ion, of formal negative charge 'd', and with stoichiometry 'e' such that d·e=m, and the charge of the counter-ion(s) offsets that of the cluster;

$R_3PN$ is an anionic phosphoranimide ligand of structure:

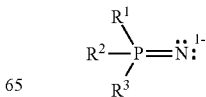

where:

$R^1$, $R^2$, $R^3$ can be the same group or different groups; $R^1$, $R^2$, $R^3$=alkyl (C1-18, primary, secondary and tertiary alkyl), cycloalkyl (C3-C8), aryl/heteroaryl, substituted aryl/heteroaryl or an inert functional group containing at least one heteroatom selected from the group consisting of a Group 15 and/or Group 16 element, and/or silicon; $R^1$, $R^2$, $R^3$ may also be linked to give cyclic systems, using linkages such as aliphatic cyclic systems; and wherein the M to R3PN$^-$ ratio in the catalyst is 1:1.
M has a formal oxidation state +2 or +3, depending on the value of m in the general formula.

According to one embodiment, the substrate for the above-mentioned hydrogenation reaction is an alkene or an alkyne.

DETAILED DESCRIPTION

Figure 1:
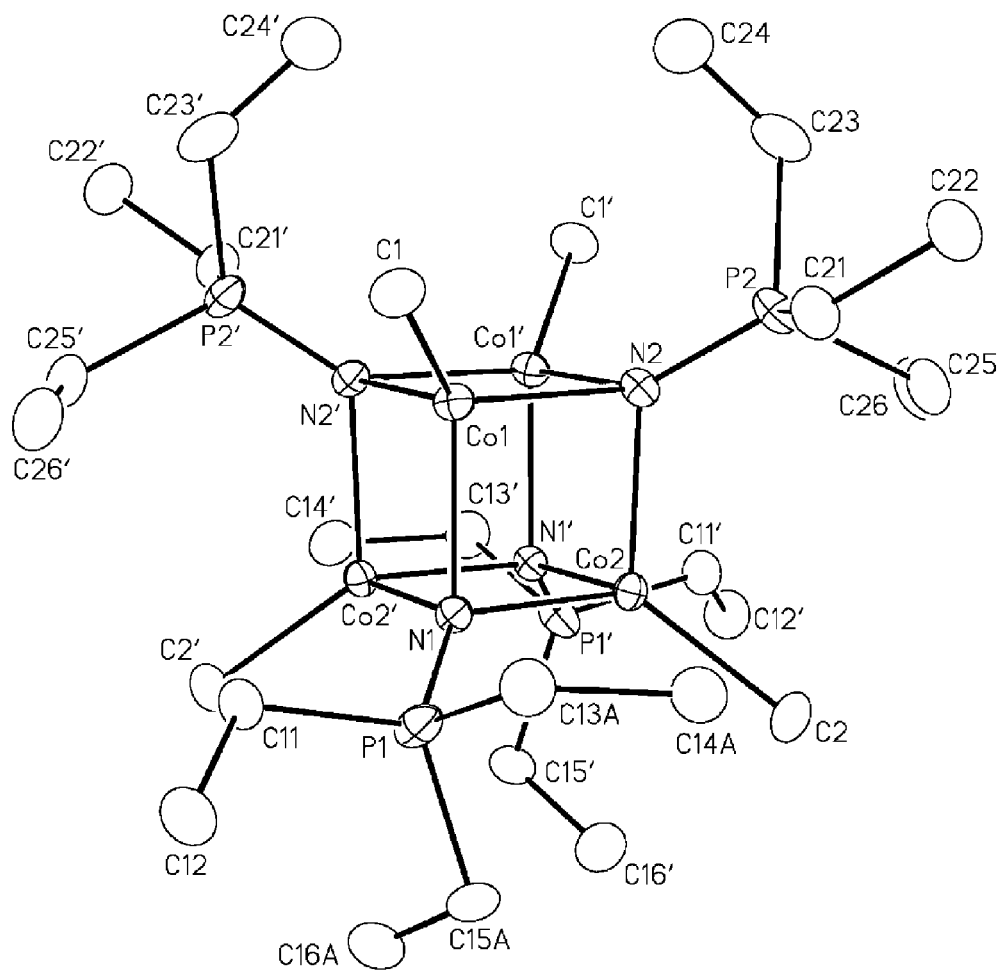
FIG. 1 shows an ORTEP diagram depicting the X-ray crystal structure of [MeCo(NPEt$_3$)]$_4$.

Industrial HDS and HDN catalysts generally comprise second- and third-row transition metals such as molybdenum, tungsten and platinum, usually in combination with ruthenium, cobalt or nickel promoters. The utilization of these relatively expensive and rare transition metals raises barriers for the sustainability of industrial hydrotreatment. Hence, it is desirable to obtain high activity catalysts for HDS and HDN from inexpensive and terrestrially abundant first-row transition metals.

First-row transition metal catalysts have traditionally been believed to possess intrinsically low activity. However, results of studies on commercial CoMoS$_2$ catalysts can be interpreted to suggest that the active sites of the catalysts may be the cobalt rather than the molybdenum centers. Examples of these studies are detailed in papers such as (1) Duchet, J. C.; van Oers, E. M.; de Beer, V. H. J.; Prins, R. *J. Catal.* 1983, 80, 386; (2) Vissers, J. P. R.; de Beer, V. H. J.; Prins, R. *J. Chem Soc. Farady Trans. I.* 1987, 83, 2145, although the present inventors do not teach this interpretation of the data. The inventors' interpretation, however, suggests that catalysts containing transition metals such as cobalt or nickel may be useful in catalysis. In particular, late first-row transition metals such as Fe, Co and Ni are relatively inexpensive and abundant, making them good candidates for use in HDS and HDN.

The present disclosure relates to homogeneous transition metal complexes that function as catalysts for HDS reactions. By assembling multiple metal centres into discrete ligand-supported clusters, catalytic activity can be enhanced. In this arrangement, neighbouring metals can act as sinks or reservoirs of electron density, or react synergistically with reagents and/or substrates, facilitating processes that typically lie beyond the ability of a single metal to mediate. Moreover, the electronic characteristics of ligand-supported clusters can be manipulated to modify the degree to which the metals can interact, which in turn modulates the reactivity of the cluster. In this way, the activation process and catalytic activity of ligand-supported metal clusters can be optimized as a function of the specific oxidation state(s) of the catalytic entity.

The catalysts of the present disclosure are ligand-supported clusters of transition metals that can be electronically modulated to optimize reactivity. This makes them good candidates for various organic transformations. The catalysts described herein comprise two to four metals, with each metal having a formal oxidation state of +2 or +3 and bonded to a monoanionic phosphoranimide ligand, and with the metal atoms bridged by the nitrogen centers of the phosphoranimide ligands. In precatalyst form, the metals are capped by monoanionic σ-bonded ligands that will undergo hydrogenolysis in the presence of hydrogen or hydrosilane to give the active form of the catalyst.

In one embodiment, the metal atoms that comprise the catalysts are cobalt. In another embodiment, the metal atoms that comprise the catalysts are iron. In another embodiment, the catalysts may comprise dimeric structures, for example, each unit of the dimer having two metal atoms, each metal atom being bridged by a phosphoranimide ligand.

The catalysts can function under relatively low temperatures (e.g., about 90° C. to about 300° C.) and relatively low hydrogen pressures (e.g., about 1 atm to about 100 atm) and can catalyze a range of reductive organic transformations, including HDS. More particularly, the catalysts can function at temperature range of about 110 to 230° C. These reaction conditions are milder than the reaction conditions typically required by commercial heterogeneous HDS catalysts. As used herein, the term "mild" is used in reference to temperature conditions lower than about 300° C. and pressure conditions less than about 100 atmospheres, and "very mild" means temperatures in the range of 110 to 230° C.

The reaction conditions required for HDS will necessarily vary, being dependent on the catalyst, the substrate and the solvent(s) used, among other factors. It has been observed that the catalysts can function at higher pressures and temperatures than solely the mild and very mild conditions just described. Accordingly, in practice, the temperature and pressure range for functionality of the catalysts is quite broad.

The majority of the hydrodesulfurization examples detailed below are conducted in the presence of stoichiometric quantities of a Brønsted base of sufficient strength to scavenge the hydrogen sulfide (H$_2$S) produced during the hydrodesulfurization reaction. Scavenging H$_2$S drives the thermodynamically unfavorable equilibrium to the catalyst regeneration step of the catalytic cycle (Scheme 1). The essentially passive role of the scavenger in the catalytic desulfurization reactions has been confirmed by a series of control experiments. The scavenger, however, can affect the kinetic parameters observed in the catalyst regeneration step(s). In industrial applications, the H$_2$S is driven into the gas phase and scavenged in a reactor that is physically separated from the hydrodesulfurization reactor. The examples focus on the laboratory scale, but the catalysts are intended for large-scale applications.

Scheme 1. Generalized hypothetical catalytic cycle for deep desulfurization by phosphoranimide-supported transition metal complexes. The cycle begins at the top with the precatalyst metal complex, [L—M—R]$_n$, where L represents a phosphoranimide ligand, M is the metal, and n represents the number of units in the cluster, i.e. for a tretramer, n = 4.

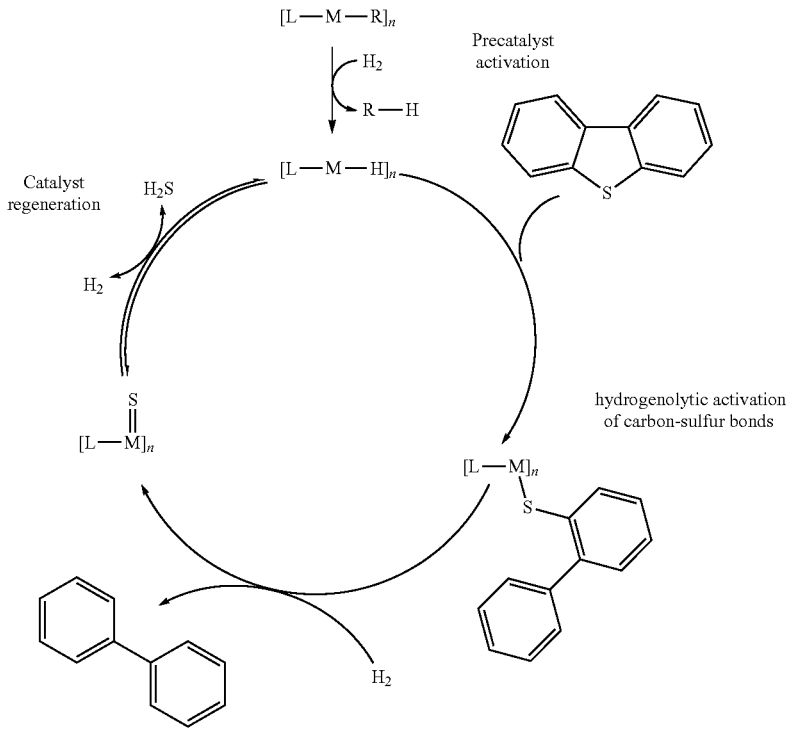

DEFINITIONS

As used throughout this disclosure, the term "alkyl" includes $C_1$ to $C_{18}$ straight chain, branched or cyclic alkyl groups such as, but not limited to, ethyl, propyl, isopropyl and t-butyl.

The term "aryl" includes aromatic hydrocarbons as substituents. Aryl groups may have one or more aromatic rings, which may be fused or connected by a connecting group or a bond. Aryl groups may also include one or more alkyl, aryl, or inert heteroatom-containing (N, O, Si) functionality as substituents located on the aryl group. Specific though non-limiting examples include, phenyl, tolyl, naphthenyl, biphenyl, alkoxy, N,N-dialkylamido.

The term "heteroaryl" includes aromatic ring systems that contain at least one heteroatom in at least one ring. Similar to the aryl groups, heteroaryl groups may have one or more aromatic rings, may be substituted or unsubstituted, and may be fused or appended to another ring, directly or through another group or bond.

The term "inert functional group" designates heteroatom-bearing hydrocarbyl fragments attached via the heteroatom to aryl and heteroaryl ligand substituents, as defined above, or appended to the terminus of a ligand substituent. The former serve to modulate, electronically and/or sterically, the chemical nature of the phosphoranimide ligand(s), changing but not impeding catalyst performance. The latter can function as a point of further chemical attachment(s) (i.e., derivatization), for example, in order to construct supported heterogeneous catalysts comprising chemically bonded or linked phosphoranimido-metal catalyst subunits grafted onto conventional or unconventional catalyst supports.

The term "heteroatom" refers to a Group 14 element other than carbon, or to a Group 15 or 16 element, preferably Si, N or O.

The term "pseudohalide" refers to anions with similar properties to halides, preferably $OSO_2R^-$, where R=Me, Ph, p-Tol, $CF_3$.

The term "weakly-coordinating counter-ion" refers to an outer-sphere (non-coordinating or nearly so) negatively charged species present to balance the charge on the partially oxidized, electronically unsaturated metal-phosphoranimido clusters. Examples include, but are not limited to, triflate ($OSO_2CF_3^-$), $PF_6^-$, $BF_4^-$, $BPh_4^-$ and $B(C_6F_5)_4^-$.

As used herein, the term "derivative" is a functionalized version of a sulfur-containing substrate where the substituent R's are not all hydrogen.

Description of Catalysts

The catalysts of the present disclosure will be referred to, throughout this disclosure, using the following general formula:

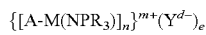  Formula I where:

A is a monoanionic σ-bonded ligand (e.g., hydrocarbyl, thiolate, alkoxide) that will undergo hydrogenolysis in the presence of hydrogen or hydrosilane. Examples include alkyl (C1-18, primary, secondary), cycloalkyl (C3-C8), alkynyl, vinyl, aryl/heteroaryl, substituted aryl/heteroaryl or a functional group containing a heteroatom bound to the metal and selected from the group consisting of a Group 15 and/or Group 16 elements, preferably alkoxide or thiolate. A can also represent one half of a dianionic heteroatom such as sulfur (as sulfido) and oxygen (as oxo). In one embodiment, A is a small alkyl group that will undergo irreversible hydrogenolysis, thereby efficiently installing a reactive hydride group on the metal;

M is Fe, Co, or Ni;

n equals 2 to 4;

m equals 0, 1, 2, 3, 4 (up to a maximum of n);

Y is a weakly-coordinating or non-coordinating counter-ion, of formal negative charge 'd', and with stoichiometry 'e' such that d·e=m, and the charge of the counter-ion(s) offsets that of the cluster;

$R_3PN$ is an anionic phosphoranimide ligand of structure:

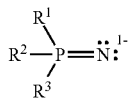

where:

$R^1$, $R^2$, $R^3$ can be the same group or different groups; $R^1$, $R^2$, $R^3$=alkyl (C1-18, primary, secondary and tertiary alkyl), cycloalkyl (C3-C8), aryl/heteroaryl, substituted aryl/heteroaryl or an inert functional group containing at least one heteroatom selected from the group consisting of a Group 15 and/or Group 16 element, and silicon; $R^1$, $R^2$, $R^3$ may also be linked to give cyclic systems, using linkages such as aliphatic cyclic systems; and wherein the M to $R_3PN^-$ ratio in the catalyst is 1:1.

In the above-mentioned Formula I, the oxidation state of the metal atom is +2 or +3, depending on the value of m.

Complexes of General Formula I that differ only in the value of 'm' represent a subclass of catalysts with the same cluster composition but different electronic states and correspondingly different numbers of charge-balancing counter-anions. The neutral "parent" clusters (m=0 in Formula I), are described by Formula II and are the synthetic precursors to the electronically modulated cluster analogs (m≠0 in Formula I).

[A-M(NPR$_3$)]$_n$  Formula II wherein A, M, n, and NPR$_3$ are the same as described for Formula I as described above.

Complexes of Formula II can be prepared from compounds of Formula III as shown below, by treatment of the compounds of Formula III with a nucleophilic reagent. Formula III has the formula shown below:

[(MNPR$_3$)$_n$X$_m$]  Formula III where:

m=2 to 4;

M is Fe, Co, or Ni;

n=2 to 4;

X can be any halide or pseudohalide; and $R_3PN$ and X are as defined for the compound of Formula I above.

To synthesize the complexes of Formula II, a compound of Formula III ([(MNPR$_3$)$_n$X$_m$]) is treated with a nucleophilic reagent functionally comprising the anion of A, in an amount sufficient to displace some or, preferably, all of the halide(s). This reaction is illustrated below:

[(MNPR$_3$)$_n$X$_m$]+AM'→[A-M(NPR$_3$)]$_n$

The source of A, is a nucleophilic reagent, AM', where M' is alkali or alkaline earth metal, or a Group 13 reagent, such as but not limited to Li, Mg, K, Al, or B. Preferably, this reaction is carried out in dioxane. As will be described below, this reaction is useful for in-situ catalysis.

Complexes of Formula I (i.e., $\{[A-M(NPR_3)]_n\}^{m+}(Y^{d-})_e$) can adopt various degrees of cluster aggregation. As an example, the present disclosure further discloses catalysts having general formula:

$\{[A-M(NPR_3)]_4\}^{m+}(Y^{d-})_e$  Formula IV wherein A, Y, d, e, M, NPR$_3$ are as defined above for the compound of Formula I.

Figure 3:
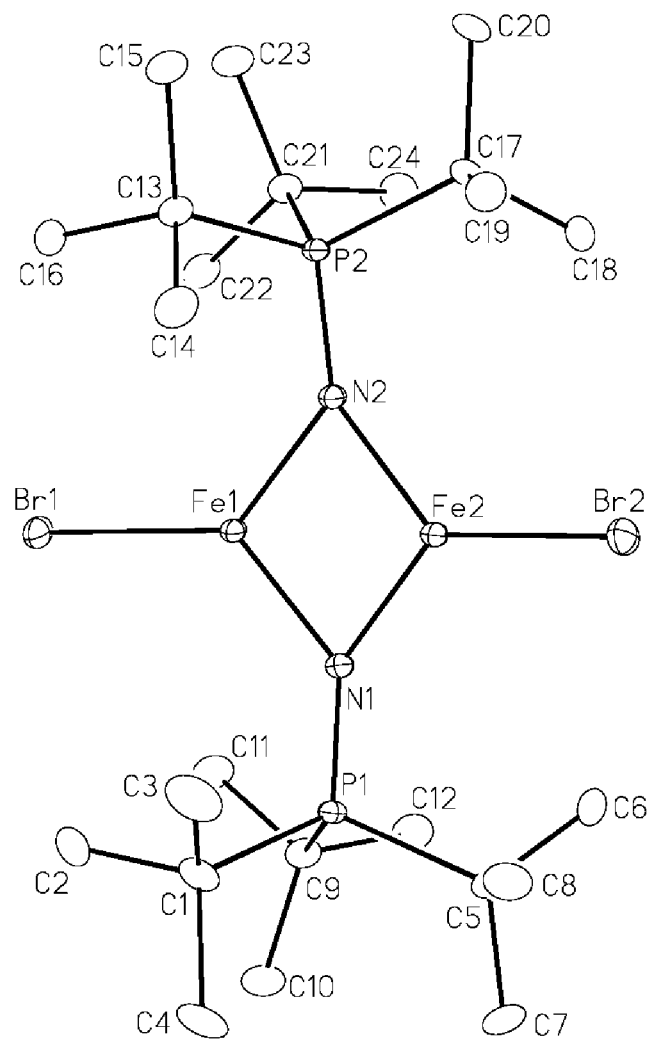
FIG. 3 shows an ORTEP diagram depicting the X-ray crystal structure of [Fe(NP$^t$Bu$_3$)Br]$_2$.

The metal centers of the catalysts of Formula IV are supported by triply bridging, anionic phosphoranimide ligands. For example, each cluster consists of four nitrogen-bridged phosphoranimido ligands and four cobalt atoms, four nickel atoms, or four iron atoms each of formal oxidation state +2 or +3 depending on the value of m. Other configurations are possible. For example, the compounds of Formula II could form dimers rather than tetramers (e.g. [A-M(NPR$_3$)]$_2$). For example, FIG. 3 shows an ORTEP diagram of [Fe(NP$^t$Bu$_3$)Br]$_2$ which is believed to be dimeric and a precursor of the catalysts that fall within the scope of Formula I as defined above.

As a person skilled in the art would appreciate, the compounds of Formula I represents a library of catalysts. Structurally characterized compounds of Formula IV comprise a subclass of catalysts of Formula I. Catalysts supported with phosphoranimide ligands of similar electronic and steric properties to, for example, triethylphosphoranimide may adopt a tetrameric structure. Sterically large phosphoranimide ligands may adopt a dimeric structure. However, unless specifically provided in the Examples below, the catalysts of the present disclosure are not limited to one particular characterized structure.

Based on the structure of the Formula IV catalysts, it should be apparent that the phosphoranimide (P=N) functional group spatially displaces $R^1$, $R^2$ and $R^3$ to a considerable distance away from the metal center, allowing for steric accessibility of the metal center. Thus, the metal center remains active, despite the presence of bulky substituents on the phosphoranimide. Each metal center in the Formula IV catalysts may have a coordination number of 4 and a formal oxidation state of +2 or +3. Some of the catalysts are expected to be dimers, in which case the metal center would not have a coordination number of 4. The steric accessibility and closely linked electronic environments of the metal centers result in enhanced activity in reductive transformations such as HDS.

In the compounds of Formula I, II, III and IV, the thermal stability of the trialkyl- and triarylphosphoranimide ligands can vary depending on the phosphorous substituents. Substituents other than alkyl or aryl group can be expected to impart similar stability and lead to electronically modulated metals as well, thus providing a range of catalysts that can be used for the HDS processes described herein.

As a more specific, non-limiting example, the catalysts of Formula IV are discrete tetrametallic transition metal clusters having the following structural formula:

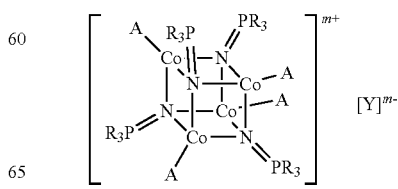

where:

A is a monoanionic σ-bonded ligand (e.g., hydrocarbyl, thiolate, alkoxide) that will undergo hydrogenolysis in the presence of hydrogen or hydrosilane;

M is cobalt in formal oxidation state +2 or +3, depending on the value of m in the general formula;

n equals 2 to 4;

m equals 0, 1, 2, 3, 4 (up to a maximum of n); and

Y and $R_3PN$ are as defined above for the compound of Formula IV.

Reaction Chemistry

The process of using the catalysts of the present disclosure involves contacting a sulfur-containing substrate with a metal catalyst of general Formula I (i.e. $\{[A-M(NPR_3)]_4\}^{m+} (Y^{d-})_e$), as defined above, in the presence of a reductant selected from hydrogen and hydrosilane to effect the reduction and cleavage of the carbon-sulfur bond(s) in the substrate. In this process, the catalyst breaks the carbon-sulfur bond(s), replacing the sulfur with hydrogen by the action of the reducing agent. At this intermediate stage, the sulfur atoms and/or sulfur-containing groups remain with the catalyst. The reducing agent then acts to convert the catalyst-bound sulfur into a reduced form (vide infra, hydrogen sulfide, alkanethiol, or aromatic thiol). In laboratory studies, a stoichiometric amount of an insoluble or soluble basic salt is added to scavenge hydrogen sulfide and/or thiol produced during the reaction. The following general reaction ("General Reaction 1") describes this process:

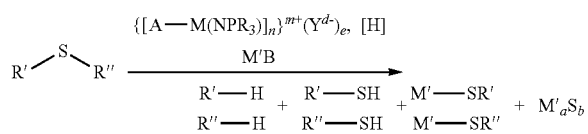

where:

R'—S—R" is an organic substrate with at least one carbon-sulfur bond; the R groups need not be the same and may be incorporated into ring and/or aromatic systems;

$\{[A-M(NPR_3)]_4\}^{m+}(Y^{d-})_e$ is a catalyst of Formula I as defined above;

[H] is a chemical reducing agent (generally hydrogen or hydrosilane);

M'B is a basic salt to scavenge $H_2S$;

$M'_aS_b$ is a sulfide salt formed from $H_2S$ scavenging, wherein a can be 1 or 2;

b can be 1 or 2;

M' SR' and M' SR" are salts of the partially hydrodesulfurized products; and

R'—H and R"—H are completely hydrodesulfurized products.

General Reaction 1 is a general equation for the HDS reaction catalyzed by catalysts disclosed herein, showing all possible terminal products that can be obtained from the HDS process using the catalysts disclosed herein. It is noted that the process can produce (1) hydrocarbons (R'—H and R"—H) or (2) partially-desulfurized products (R'—SH and R"—SH) or (3) a mixture of hydrocarbons and partially desulfurized products. The hydrocarbons may be saturated or unsaturated. The catalysts competitively hydrogenate aliphatic unsaturation concomitant with the HDS process, but do not saturate aromatic moieties. Reactions run to partial conversion invariably produce either (2) or (3) instead of the terminal hydrocarbon. In one example, aromatic hydrocarbons or a mixture of aromatic hydrocarbons and aromatic thiols can be produced from the catalytic HDS of diaryl sulfides. In another example, dibenzothiophene and alkyl-substituted dibenzothiophenes can be hydrodesulfurized into the corresponding biphenyl compound or a mixture of biphenyl and thiobiphenyl compounds, depending on reaction conditions and times.

The presence of saturated hydrocarbon fragments in some product mixtures, as detailed in the examples, reveals that the catalysts described herein execute catalytic hydrogenation of nonaromatic unsaturated hydrocarbons in addition to hydrodesulfurization. For example, the catalysts of the present disclosure also catalyze the hydrogenation of alkenes and alkynes, with the exception of hydrogenation across aromatic moieties. The reaction conditions described below for the HDS reactions apply to the hydrogenation reactions.

All catalyst loadings where the catalyst to substrate ratio is less than 1:1 can be used for catalytic hydrodesulfurization ("HDS"). Generally, the ratio of substrate to catalyst can range from much greater than 1000:1 to equimolar (1:1), the catalyst functioning under a range of conditions. The catalyst loadings detailed in the Examples range from about 1:700 to 1:15. Suitable catalyst-to-substrate ratios will be dependent on the specific catalyst, concentration, reaction time, and feedstock, among other factors, as can be readily appreciated by a person skilled in the art.

The HDS reactions described above as General Reaction 1 may be carried out, optionally, in an inert organic solvent. By "inert", it is meant that the solvent does not react with or deactivate the catalyst or chemically interfere in the HDS process. For example, halogenated solvents such as, but not limited to, dichloromethane ($CH_2Cl_2$) should generally be avoided. Solvents such as toluene, xylene, decalin, methylnaphthalene or tetrahydrofuran (THF) have been used for certain examples. Toluene and THF have been generally used in the examples described herein. THF is advantageous to maintaining the solubility of the reaction components, intermediates, and products throughout the reaction, except for the sometimes insoluble scavenger and terminal sulfide salt. Reactions may also be run under triphasic conditions, also called the slurry phase, where some of the substrate, some of the catalyst, or some of each intermediate component are not completely dissolved in the selected solvent medium. The choice of solvent will vary with the properties of the substrate(s) under reduction.

The chemical reducing agent can be molecular hydrogen ($H_2$) or an organic silyl hydride. When the reducing agent is an organic silyl hydride, the reductant may be chosen from the group of phenylsilane, diphenylsilane, dimethylphenylsilane and ethylsilane, among other reactive silanes. When hydrogen gas is used as the reducing agent, pressures of 1 atm or higher are typically employed. The reductant is used in an amount sufficient to effectuate the desired level of HDS, which is generally complete HDS. In the case of hydrogen, reactions are routinely run in the presence of an excess of the reductant, or under conditions of constant hydrogen pressure, wherein the reductant is fractionally dissolved in the medium and is replenished as it is consumed, optimally maintaining a solution saturated in the reductant. In the case of silane, an excess is generally used and no basic scavenger is added to the reduction medium: the silane reacts with the thiol intermediates and any $H_2S$ byproduct formed during the reaction to form silylthioethers, which passivates the acidic sulfur compounds as they are formed.

In addition, the reaction can be carried out at temperatures ranging from about 90° C. to greater than 300° C. In one embodiment, the optimal temperature may be between about 110° C. and 230° C. The optimal temperature for the reaction will vary depending on the reactor design, reaction scale, solvent(s), reaction time chemical feedstock, and desired rate of conversion or throughput. Based on this disclosure, the optimum reaction temperature for a particular reaction can be determined by those skilled in the art. The catalysts tolerate a broad range of reaction temperatures above the low-temperature threshold for conversion. The temperature and pressure conditions described herein are milder to very much milder than those typically employed in industrial HDS. Accordingly, these catalysts have potential use in industrial processes such as the catalytic HDS of petroleum feedstocks.

The ratio of the basic metal salts (i.e., the scavenger) to the sulfur-containing substrate can be equal to or greater than 2:1. In the Examples provided below, the ratio of basic salt to substrate ranges from about 2:1 to 10:1. The basic metal salts used to scavenge $H_2S$ can be selected from the group consisting of Group I and Group II metal hydrides, but are not limited to these groups. For example, the Group I metal hydrides may be LiH, NaH, KH or CsH, or a mixture thereof. Group II metal hydrides can be selected from $MgH_2$ and $CaH_2$. The use of metal hydride scavengers is suitable because the reagent is insoluble in the reaction medium and the reaction between hydride anions and $H_2S$ to produce $H_2$ gas is irreversible. In addition, the basic metal salts employed in the process can be selected from the group consisting of Group I and Group II salts of strong organic bases, preferably with pKa higher than 20, but are not limited to these organic bases. For example, basic Group I and II salts may be amide salts such as lithium diisopropyl amide (LDA), potassium diisopropylamide (KDA), or Grignard reagents (e.g. alkyl or aryl magnesium halides).

Purified Catalyst

In one aspect, the process includes the HDS of a range of sulfur-containing organic substrates containing at least one carbon-sulfur bond by introducing a "purified" catalyst of Formula I (i.e. $\{[A-M(NPR_3)]_4\}^{m+}(Y^{d-})_e$). By "purified", it is meant that the catalyst is isolated and subjected to purification methods prior to use for catalytic hydrodesulfurization, as described in the Examples provided below. The purity may be determined via elemental analysis, for example. To carry out this process, the purified catalysts of Formula I as described above are contacted with an organic substrate having at least one carbon-sulfur bond in the presence of a reducing agent. The reducing agent reacts with the sulfur-containing substrate, converting the carbon-sulfur bonds to carbon-hydrogen bonds. Hydrocarbons or partially desulfurized products (e.g. thiols) or a mixture of hydrocarbons and partially desulfurized products are produced. The process can be carried out using the reaction conditions as described above for General Reaction 1.

In Situ Prepared Catalyst

Another aspect of the present disclosure relates to the use of an in situ-prepared (or in situ-derived) catalyst in HDS reactions. By "in situ", it is meant that the catalyst is not subject to isolation and purification after synthesis, but instead prepared and used directly in the catalytic process. In one embodiment, the catalyst of Formula I (i.e. $\{[A-M(NPR_3)]_n\}^{m+}(Y)^{m-}$) wherein m>0 is synthesized in situ and used for HDS directly, without isolation or purification.

Outer Sphere Oxidation

In one embodiment, the in situ-derived catalyst is produced through the outer-sphere oxidation (using an organic or organometallic oxidizing agent) of a neutral parent complex of Formula II.

The outer-sphere oxidation step can be carried out in inert organic solvents such as tetrahydrofuran, hexane, benzene, diethyl ether, or toluene. However, halogen-containing solvents, such as $CH_2Cl_2$, for example, are generally not appropriate for this oxidation step.

Outer-sphere oxidants have redox potentials suitable for the required oxidations. The outer sphere oxidant may be any compound that has sufficiently strong oxidation potential to extract one or more electrons from the precatalyst (e.g. the catalyst of Formula II). The weakest outer sphere oxidant would remove only one electron from the catalyst cluster, whereas stronger oxidants could remove solely one electron or could remove more than one electron. However, the number of electrons removed does not depend solely on the oxidation potential of the metal, but also, on the ratio of the oxidant to the cluster. Thus, the oxidant could be chosen to yield anywhere from a positive charge of 1 to 4 on the cluster. Most commonly, outer-sphere oxidants are categorized as inorganic or organic oxidants. Inorganic oxidants include, but are not limited to: cations (e.g. ferrocenium, silver(I), copper(II), Fe(III), or Ce(IV) salts), anionic complexes (e.g. $[IrCl_6]_2^-$, $[PtCl_6]_2^-$), neutral compounds (e.g. $[Ni(tfd)_2]$ and $[Mo(tfd)_3]$), and main group oxidants (e.g. halogens, nitrosonium salts). Organic oxidants include, but are not limited to: radical cations (e.g. $[N(aryl)_3]^+$, thianthrenes), carbocations (trityl or tropylium salts), and quinone derivatives.

The ratio of the oxidizing agent to the total amount of M in the complex of Formula II $\{[A-M(NPR_3)]_n$ may vary depending on the specific oxidant, the stoichiometry of the reaction, and desired degree of oxidation. For example, when the oxidizing agent is $Cp_2FePF_6$, the ratio of the oxidizing agent to complex with Formula II can range from, but is not limited to, about 1:1 to 4:1, the excess reagent does not effect a second one-electron oxidation of the cluster. When oxidizing with stronger oxidants, for example, $AgBF_4$, the stoichiometry must be controlled to effect the desired degree of oxidation (i.e., value of m in Formula I). The oxidation may be carried out in solvents selected from, but not limited to, tetrahydrofuran, dialkyl ethers, toluene and, as a suspension or slurry, saturated hydrocarbons such as pentane and hexanes.

The oxidation step can be conducted at low to ambient temperatures. By "low", it is meant temperatures below about 0° C. and by "ambient", it is meant about normal room temperature. The preferred temperature for the oxidation reaction varies with the complex of Formula I, II, III, or IV the solvent used, the concentrations of the various components, and the choice of oxidizing agent. A person skilled in the art would be able to determine the appropriate reaction temperature. For example, temperatures may range from about −80 to 25° C., when the reaction is carried out in an inert organic solvent. As a specific but non-limiting example, the oxidation of $[CoMe(NPEt_3)]_4$ using $Cp_2FePF_6$ in toluene, producing $[CoMe(NPEt_3)]_4^+PF_6^-$, may be carried out at about −35° C.

The solution from the oxidation process, containing the in situ-derived catalyst, $\{[A-M(NPR_3)]_4\}^{m+}(Y^{d-})_e$ can be directly used for HDS without carrying out the purification procedures described in the synthesis of thoroughly characterized and purified catalyst of Formula I (i.e. $\{[A-M(NPR_3)]_4\}^{m+}(Y^{d-})_e$).

The in situ-derived or unpurified catalyst desulfurizes organic substrates with at least one carbon-sulfur bond under the same reaction conditions described for General Reaction 1 using the purified catalyst of Formula I (i.e. $\{[A-M(NPR_3)]_4\}^{m+}(Y^{d-})_e\}$). The process pertains to contacting an organic molecule with at least one carbon-sulfur bond with the in situ-derived catalyst in the presence of a reducing agent to cause the reducing agent to react with the sulfur-containing substrate, converting all or some of the carbon-sulfur bonds to carbon-hydrogen bonds, to produce hydrocarbons or a mixture of hydrocarbons and partially desulfurized products. The process can be conducted optionally in the presence of an inert organic solvent as described above using "purified catalysts" for HDS.

Nucleophilic Reagent

The in-situ HDS reaction can also be performed by treating a compound of Formula III [(MNPR$_3$)$_n$X$_m$] with a nucleophilic reagent functionally comprising the anion of A, in an amount sufficient to displace some or, preferably, all of the halide(s). This reaction is illustrated below:

[(MNPR$_3$)$_n$X$_m$]+AM'→[A-M(NPR$_3$)]$_n$

The source of A, is a nucleophilic reagent, AM', where M' is alkali or alkaline earth metal, or a Group 13 reagent, such as but not limited to Li, Mg, K, Al, or B. The use of dioxane as the medium and a magnesium anion for this transmetallation reaction is a suitable embodiment and a factor in forcing complete exchange of the halide with AM' in complexes of Formula III. The methylation equilibrium should be driven to completion via the use of a solvent or additive to 'sequester' the magnesium salts and drive the reaction to completion. The sequestration may take place in solution or by phase separation (e.g. precipitation) of the magnesium halide salts formed during the reaction. While dioxane is suitable in this regard, other solvents that serve the same function (e.g. to drive the reaction to equilibrium) could be used and other alkali or earth metals may be used. That said, in some solvent systems and with some M' counter-ions, such exchange reactions do not generally lead to pure, tractable products wherein the halides groups have been completely replaced. A person skilled in the art could select suitable solvents based on the teachings in the present disclosure.

This in-situ reaction is carried out in a reducing environment (such as in hydrogen or an organic silyl hydride). The substrate with at least one carbon-sulfur bond is added directly to the reaction mixture (e.g. a compound of Formula III is reacted with a nucleophilic agent comprising the anion of A in a reducing environment to which the substrate is added).

An example of a nucleophilic reagent that can be used in the above-mentioned process, an alkylating agent may be used. More specifically, the compounds of Formula III can be treated with an alkylating agent functionally comprising the anion of A. The alkylating agent may be, for example, a hydrocarbyl anion (such as methyl, ethyl, vinyl, alkynl, an aryl, etc.), an oxygen anion or a sulfur anion. The reaction is placed in a reducing environment (with hydrogen or an organic silyl hydride as reductant) and an organic substrate may be added directly to the reaction medium.

In Situ Hydrogenation Reactions

In addition, since the catalysts of the present disclosure can also catalyze hydrogenation reactions, they can also be used to catalyze the hydrogenation of non-aromatic carbon-carbon multiple bonds (alkenes and alkynes). The methods described above for the in situ HDS reactions can also be used for hydrogenation, without the need for purification of the catalysts.

Substrates for HDS

The catalysts of the present disclosure, whether purified or in situ-derived, can be used for the HDS of a range of organic substrates having at least one carbon-sulfur bond. The present disclosure exemplifies substrates that model the sulfur-containing functionality and structural types typically found in petroleum feedstocks. The classes of sulfur-containing substrates known to be present in petroleum include thiophene derivatives, thiols, sulfide ethers, disulfide ethers, among others. HDS of these compounds is important to address issues relating to the environmental impact of SO$_x$ emission and the economical production of environmentally safe (ultra-low sulfur or sulfur-free) fuels.

As a person skilled in the art would appreciate, the class of organic sulfur-containing substrates that can be reductively desulfurized using the catalysts described herein is very broad. The substituents present on the substrates can be aliphatic, aromatic, unsaturated, contain heteroatoms, be cyclic or linear, possess functional groups, or contain a combination of these features. The common feature underlying these substrates is that they contain at least one carbon-sulfur bond, and the common underlying transformation is that the carbon-sulfur bond is transformed into a carbon-hydrogen bond. Hydrogenation of the aromatic hydrocarbon nucleus is not competitive with desulfurization and is rarely observed, as the examples demonstrate. Hydrogenation of aliphatic unsaturation, whether present in the original substrate or produced as an intermediate during HDS, typically, but not universally, at competitive rates.

The present disclosure exemplifies the desulfurization of different classes of sulfur-containing organic substrates. Accordingly, as will be discussed below, these catalysts can be used for the HDS of dibenzothiophene and its derivatives. Derivatives are compounds containing the named ring system or subunit but having one or more of the hydrogen atoms replaced (substituted) by a non-hydrogen element. Dibenzothiophene and its derivatives constitute the most refractory sulfur-containing components known to be present in petroleum. By refractory, it is meant that these substrates are resistant to catalytic hydroprocessing due to the strength of the carbon-sulfur bonds and steric inaccessibility of the sulfur-functional group.

An aspect relates to the HDS of dibenzothiophene and dibenzothiophene derivatives. The reaction conditions employed in this process are similar to those described above for General Reaction 1 in relation to the catalyst of Formula I (i.e. $\{[A-M(NPR_3)]_4\}^{m+}(Y^{d-})_e$). The sulfur-containing substrate can be represented by the following formula:

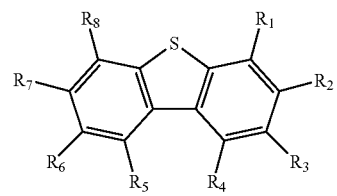

where:

R$^1$, R$^2$, R$^3$, R$^4$, R$^5$, R$^6$, R$^7$, R$^8$ can be the same group or different groups;

R$^1$, R$^2$, R$^3$, R$^4$, R$^5$, R$^6$, R$^7$, R$^8$ can be hydrogen, alkyl (C1-18, primary, secondary and tertiary alkyl), cycloalkyl (C3-C8), aryl/heteroaryl, substituted aryl/heteroaryl or a functional group optionally containing at least one heteroatom;

any two vicinal R groups may also be linked to give cyclic systems, both aliphatic and aromatic [(e.g., R1/R2=—(CH$_2$)$_n$—, where n=3-10]; and the term "heteroatom" refers to Group 15 and 16 elements, such as N, S and O. As noted, suitable temperatures and pressures will vary as a function of the solvent used, the concentration of the components, the substrate, and the catalyst, among other factors. Similarly, the solvent will vary depending on the structure and properties (i.e., solubility) of the substrate, but can be determined by a person skilled in the art.

The present disclosure presents Examples wherein dibenzothiophene and substituted dibenzothiophenes are stoichiometrically or catalytically hydrodesulfurized (vide infra).

The catalysts of the present disclosure also desulfurize thiophene and thiophene derivatives. The reaction conditions employed in this process are similar to those described for General Reaction 1 above. The substrate can be represented by the general formula:

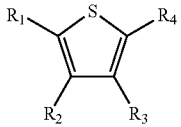

where:

$R^1$, $R^2$, $R^3$, $R^4$ can be the same group or different groups;

$R^1$, $R^2$, $R^3$, $R^4$ can be alkyl (C1-18, primary, secondary and tertiary alkyl), cycloalkyl (C3-C8), aryl/heteroaryl, substituted aryl/heteroaryl or a functional group optionally containing at least one heteroatom;

any two vicinal R groups may also be linked to give cyclic systems, both aliphatic and aromatic [(e.g., R1/R2=—(CH$_2$)$_n$—, where n=3-10];

the term "heteroatom" refers to Group 15 and 16 elements, such as N, S and O.

The catalysts of the present disclosure also desulfurize benzothiophene and benzothiophene derivatives. The reaction conditions employed in this process are similar to those described above for General Reaction 1. The substrate can be represented by the general formula:

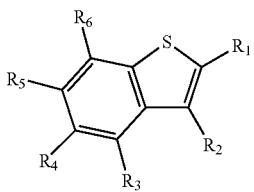

where:

$R^1$, $R^2$, $R^3$, $R^4$, $R^5$, $R^6$ can be the same group or different groups;

$R^1$, $R^2$, $R^3$, $R^4$, $R^5$, $R^6$ can be hydrogen, alkyl (C1-18, primary, secondary and tertiary alkyl), cycloalkyl (C3-C8), aryl/heteroaryl, substituted aryl/heteroaryl or a functional group optionally containing at least one heteroatom;

any two vicinal R groups may also be linked to give cyclic systems, both aliphatic and aromatic [(e.g., R1/R2=—(CH$_2$)$_n$—, where n=3-10]; and the term "heteroatom" refers to Group 15 and 16 elements, such as N, S and O.

In another embodiment, the catalysts also desulfurize aromatic and aliphatic sulfides (sulfur ethers) into hydrocarbons and/or thiols. Alkyl- and arylthiols also undergo desulfurization, giving the hydrocarbon product, generally without aromatic hydrogenation. The reaction conditions employed in this process are similar to those described above for General Reaction 1. The substrate can be represented by the general formula:

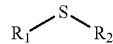

where:

$R^1$, $R^2$ can be the same group or different groups; $R^1$, $R^2$ can be alkyl (C1-18, primary, secondary and tertiary alkyl), cycloalkyl (C3-C8), aryl/heteroaryl, substituted aryl/heteroaryl or a functional group optionally containing at least one heteroatom. Either $R_1$ or $R_2$ can be hydrogen; and $R^1$ and $R^2$ may also be linked to give cyclic systems, both aliphatic and aromatic [(e.g., R1/R2=—(CH$_2$)$_n$—, where n=3-10]; and the term "heteroatom" are Group 15 and 16 elements, such as N, S and O. In a specific example, diphenyl sulfide can be desulfurized into a benzene and thiophenol. Prolonged reaction times result in a higher benzene to thiophenol ratio, demonstrating that thiophenol, a substrate containing only one carbon-sulfur bond, is desulfurized to produce benzene under the reaction conditions described in this disclosure.

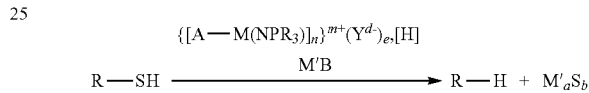

where

R—SH is an organic substrate with at least one carbon-sulfur bond;

$\{[A\text{-}M(NPR_3)]_4\}^{m+}(Y^{d-})_e$ is a catalyst of Formula I as defined above;

[H] is a chemical reducing agent; generally hydrogen or hydrosilane;

M'B is a basic salt to scavenge H$_2$S;

$M'_aS_b$ is a sulfide salt formed from H$_2$S scavenging, wherein a can be 1 or 2;

b can be 1 or 2;

R—H is a hydrodesulfurized product (either completely or partially).

In the case of diaryl thioethers, the aromatic rings can be linked by a group E:

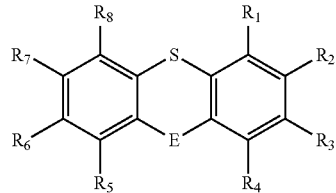

where:

E=alkyl, O, S, NR$^9$;

$R^1$, $R^2$, $R^3$, $R^4$, $R^5$, $R^6$, $R^7$, $R^8$, $R^9$ can be the same group or different groups; $R^1$, $R^2$, $R^3$, $R^4$, $R^5$, $R^6$, $R^7$, $R^8$, $R^9$ can be hydrogen, alkyl (C1-18, primary, secondary and tertiary alkyl), cycloalkyl (C3-C8), aryl/heteroaryl, substituted aryl/heteroaryl or a functional group optionally containing at least one heteroatom; any two vicinal R groups may also be linked to give cyclic systems, both aliphatic and aromatic [(e.g., $R^1/R^2$=—(CH$_2$)$_n$—, where n=3-10]; and the term "heteroatom" refers to Group 15 and 16 elements, such as N, S and O.

The examples described in this disclosure include substrates of varying steric and electronic properties. Both sterically accessible and, at the other extreme, sterically inaccessible substrates were tested. Sterically accessible substrates tend to stick together, thereby deactivating the catalysts, whereas sterically inaccessible substrates cannot be accessed by the active site of the catalysts. Substrates incorporating sterically hindered carbon-sulfur bonds are not known to be desulfurized by homogeneous or heterogeneous transition metal catalysts. It should be apparent to a person skilled in the art that substrates containing carbon-sulfur bonds with steric accessibility intermediate to the provided range of examples can also be desulfurized by the catalysts described herein. Furthermore, various substituents and degree of substitution are disclosed to illustrate, though not intended to limit, the variations in the electronic properties of the substrates that can be desulfurized by the catalysts described herein. The substituents presented as examples include some of the functional groups known present in sulfur-containing components of petroleum such as, but not limited to, alkyl, aromatic, heteroaromatic and alkoxy groups.

The following specific examples are included for illustrative purposes only.

EXAMPLES

In these examples, the following terms are used:
Ar—H=the completely desulfurized organic product from aromatic hydrodesulfurization.
Ar—SH=the product of the first aromatic C—S bond scission.

Example 1

[MeCo(NPEt$_3$)]$_4$ and Method of Synthesis

A methyl-capped cobalt phosphoranimide catalyst (shown in FIG. 1 and referred to herein as the neutral cobalt catalyst) having the formula shown below is synthesized as an example:

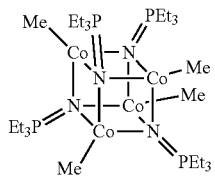

To prepare this catalyst, 0.55 mmol of [CoCl(NPEt$_3$)]$_4$ and 0.22 mmol of Me$_2$Mg.dioxane are separately dissolved in 8 mL portions of dioxane in 15 mL screw-capped vials under an inert atmosphere, for example, in a nitrogen or argon-filled drybox. Both solutions are cooled to 12° C. The Me$_2$Mg.dioxane solution is added drop-wise to the [CoCl(NPEt$_3$)]$_4$ with occasional stirring over a two hour period with the temperature constant at 12° C. The solvent is removed in vacuo and the residue is triturated with 4 mL portions of cold pentane thrice. The pentane washes are pooled and filtered through celite. The solvent is removed in vacuo, giving a green powder in 86% isolated yield. The product crystallizes as dark green prismatic crystals from liquid-liquid layering, slowly diffusing hexane into a concentrated solution of the crude product at −35° C.

The product is characterized by X-ray crystallography, magnetic susceptibility measurement by the Evan's method (Evans, D. F. J. J. Chem. Soc. 1959, 2003-2005, which is herein incorporated by reference), and elemental analysis (vide infra).

FIG. 1 shows an ORTEP (Oak Ridge Thermal Ellipsoid Plot) diagram depicting the X-ray crystal structure of [MeCo(NPEt$_3$)]$_4$. The calculated elemental composition of the neutral cobalt catalyst is C, 40.79%; H, 8.80%; N, 6.80%. The determined elemental composition is C, 40.69%; H, 8.80%; N, 6.68%. Solution magnetic susceptibility experiments revealed that the neutral cobalt catalyst is a 4.01-electron paramagnet ($\mu_{eff}$=4.90$\mu_{Bo}$) at room temperature.

Example 2

[MeCo(NPEt$_3$)]$_4$PF$_6$ and Method of Synthesis

A cationic methyl-capped cobalt phosphoranimide catalyst (shown in FIG. 1 and referred to herein as the singly- or monocationic cobalt catalyst) having the formula shown below is synthesized as an example:

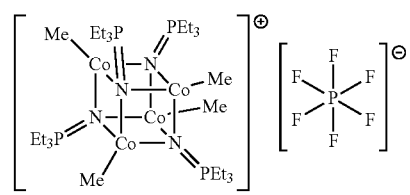

To prepare this catalyst, 0.31 mmol of [MeCo(NPEt$_3$)]$_4$ and 0.28 mmol of Cp$_2$FePF$_6$ are dissolved/suspended in 5 ml portions of toluene in 15 mL screw-capped vials under an inert atmosphere, for example, in a nitrogen- or argon-filled drybox. Both samples are cooled to −35° C. in a dry-box freezer for an hour. The Cp$_2$FePF$_6$ suspension is added drop-wise into the [MeCo(NPEt$_3$)]$_4$ solution over a four-hour period with the temperature constant at −35° C. After two hours of stirring at room temperature, the reaction solids were separated by filtration through a glass frit and washed with 15 mL portions of hexane thrice. The remaining solids are dissolved in 15 mL of tetrahydrofuran and filtered through a plug of Celite. The solvent is removed in vacuo, giving a 91% yield.

Figure 2:
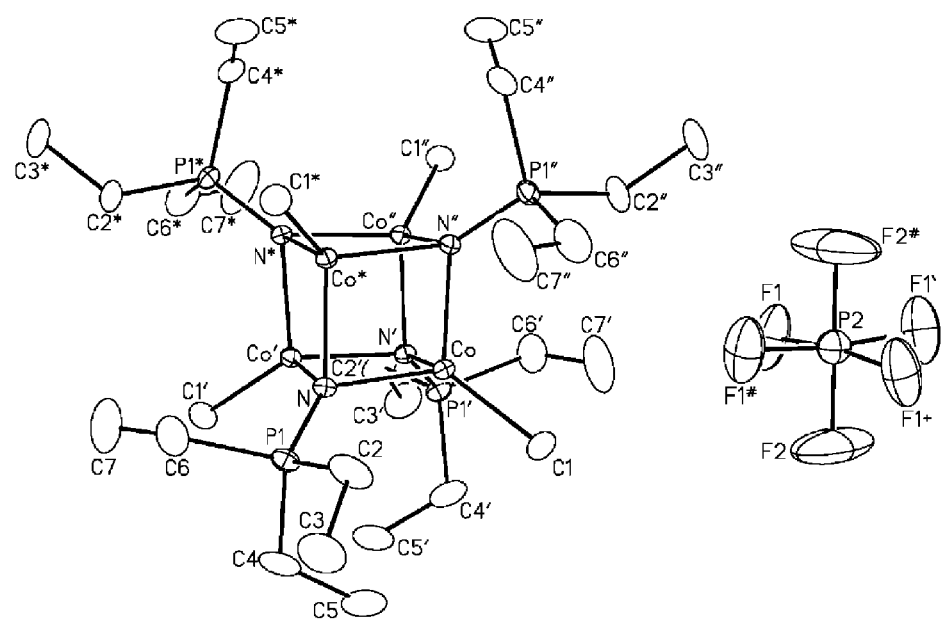
FIG. 2 shows an ORTEP diagram depicting the X-ray crystal structure of [MeCo(NPEt$_3$)]$_4$P$_4$$_6$.

FIG. 2 shows an ORTEP (Oak Ridge Thermal Ellipsoid Plot Program) diagram depicting the X-ray crystal structure of [MeCo(NPEt$_3$)]$_4$PF$_6$. The calculated elemental composition of the singly-cationic cobalt catalyst is C, 34.69%; H, 7.49%; N, 5.78%. The determined elemental composition is C, 34.75%; H, 6.96%; N, 5.62%. Solution magnetic susceptibility experiments revealed that the neutral cobalt catalyst is a 4.90-electron paramagnet ($\mu_{eff}$=5.82$\mu_{Bo}$) at room temperature.

Example 3

[MeFe(NP$^t$Bu$_3$)]$_2$ and Method of Synthesis

A methyl-capped iron phosphoranimide catalyst (referred to herein as the neutral iron catalyst) having the empirical formula shown below is synthesized as an example. The precursor is known to be a dimer having structure: [MCl(NPR$_3$)]$_2$. Accordingly, the pre-catalyst is presumed to be dimeric, of structure: [MMe(NPR$_3$)]$_2$:

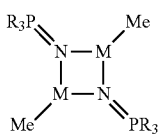

To prepare this catalyst, 8.5 mmol of FeCl$_2$ is suspended in 30 mL of tetrahydrofuran (THF) and cooled to −80° C. An ether solution of 9.1 mmol MeLi was added drop-wise over 30 minutes. The reaction is stirred for three hours at −80° C. A suspension of 8.7 mmol LiNP$^t$Bu$_3$ in 90 mL THF is cooled to −78° C. and added slowly via cannula to the reaction. The reaction is stirred for 16 hours at −80° C. and then warmed to room temperature. The THF is removed in vacuo and the residue suspended in 60 mL of pentane. The suspension is stirred for 24 hours, then filtered through a plug of Celite. The pentane is removed in vacuo and the residue dried under high vacuum for 16 hours. The residue is suspended in 40 mL of cold pentane, and filtered through a plug of Celite. The cold filtration is repeated and then the pentane removed in vacuo. The yield for this reaction is 29%. The product was characterized by elemental analysis.

The calculated elemental composition of MeFeNP$^t$Bu$_3$.0.3 THF is C, 55.22%; H, 10.57%; N, 4.54%. The determined elemental composition is C, 55.05%; H, 10.48%; N, 4.93%.

Example 4

Method for Hydrodesulfurization of Dibenzothiophene Using Neutral [FeMe(NP$^t$Bu$_3$)]$_2$ and In Situ Prepared [FeMe(NP$^t$Bu$_3$)]$_2$PF$_6$ and [FeMe(NP$^t$Bu$_3$)]$_2$(PF$_6$)$_2$ Catalysts The preparation of reaction mixture is conducted under an inert atmosphere, for example, in a nitrogen-filled dry box. A Teflon-sealed reactor is charged with dibenzothiophene, [FeMe(NP$^t$Bu$_3$)]$_2$, Cp$_2$FePF$_6$, KH, 10 mL toluene, and a stir bar as per the quantities in Table 1. The reactor was taken out of the dry box and connected to a hydrogen manifold. The reaction vessel is then charged with H$_2$ (1 atm), employing strict inert-atmosphere laboratory techniques. The reaction mixture is then stirred at a 1200 rpm for 4 hours in an oil bath at 130° C.

The reactor is cooled to room and the reaction mixture quenched with a 10% HCl solution. The organic products are extracted through diethyl ether-water extractions using three 6 mL portions of diethyl ether. The diethyl ether fractions are pooled, dried with anhydrous Na$_2$SO$_4$ and filtered through a small column of Florisil™. The diethyl ether is removed in vacuo and the weighed residue dissolved in CDCl$_3$ for $^1$H-NMR and GC-MS analyses. The process as described produces biphenyl and 2-phenylthiophenol exclusively as outlined in Table 1.

TABLE 1

Summary of Hydrodesulfurization of dibenzothiophene using [FeMe(NP$^t$Bu$_3$)]$_2$ and in situ prepared catalysts.

| | Dibenzothiophene mg (mmol) | [FeMe(NP$^t$Bu$_3$)]$_2$ mg (mmol) | Cp$_2$FePF$_6$ mg (mmol) | KH mg (mmol) | % Conversion Ar—H | Ar—SH |
|---|---|---|---|---|---|---|
| 1 | 131 (0.71) | 20 (0.03) | 0 (0.000) | 56 (1.40) | 10.8 | 16.7 |
| 2 | 129 (0.70) | 20 (0.03) | 6 (0.018) | 56 (1.40) | 8.1 | 14.0 |
| 3 | 131 (0.71) | 20 (0.03) | 12 (0.036) | 56 (1.40) | 4.1 | 6.3 |

The general reaction conditions employed for carrying out the reactions in Table 1 are as follows. In a nitrogen-filled drybox, dibenzothiophene, [FeMe(NPEt$_3$)]$_2$, Cp$_2$FePF$_6$ and potassium hydride, are mixed in toluene (10 mL). The mixture is transferred into a medium-walled glass pressure reactor equipped with a Teflon magnetic stir bar. The reaction vessel is charged with H$_2$ (1 atm), employing strict inert-atmosphere laboratory techniques, and heated to 130° C. in an oil bath on a heating magnetic stir plate, stirring at 1200 rpm for 4 hours.

Example 5

Method for Hydrodesulfurization of Dibenzothiophene Using Neutral [CoMe(NPEt$_3$)]$_4$ Catalyst The preparation of the reaction mixture is conducted under an inert atmosphere, for example, in a nitrogen-filled dry box. A Teflon-sealed steel autoclave is charged with 63 mg (0.31 mmol) dibenzothiophene, 1 mg (1.2×10$^{-3}$ mmol) [CoMe(NPEt$_3$)]$_4$, 55 mg (1.36 mmol) KH, 10 mL toluene, and a stir bar. The reactor was taken out of the dry box and connected to a hydrogen regulator. The reaction vessel is then charged with H$_2$ (34 atm), employing strict inert-atmosphere laboratory techniques. The reaction mixture is then stirred at a 1200 rpm for 17 hours in an oil bath at 150° C.

The reactor is cooled to room and the reaction mixture quenched with a 10% HCl solution. The organic products are extracted through diethyl ether-water extractions using three 6 mL portions of diethyl ether. The diethyl ether fractions are pooled, dried with anhydrous Na$_2$SO$_4$ and filtered through a small column of Florisil™. The diethyl ether is removed in vacuo and the weighed residue dissolved in CDCl$_3$ for $^1$H-NMR and GC-MS analyses. The process as described gives 34% conversion and produces biphenyl (14%) and 2-phenylthiophenol (20%), exclusively, as products.

Example 6

Method for Hydrodesulfurization of 4,6-Diethyldibenzothiophene Using [CoMe(NPEt$_3$)]$_4$ Catalyst The preparation of the reaction mixture is conducted under an inert atmosphere, for example, in a nitrogen-filled dry box. A Teflon-sealed steel autoclave reactor is charged with 45 mg (0.18 mmol) 4,6-diethyldibenzothiophene, 10 mg (1.2×10$^{-2}$ mmol) [CoMe(NPEt$_3$)]$_4$, 30 mg (0.76 mmol) KH, 10 mL toluene, and a stir bar. The reactor was taken out of the dry box and connected to a hydrogen regulator. The reaction vessel is then charged with H$_2$ (34 atm), employing strict inert-atmosphere laboratory techniques. The reaction mixture is then stirred at a 1200 rpm for 17 hours in an oil bath at 150° C.

The reactor is cooled to room and the reaction mixture quenched with a 10% HCl solution. The organic products are extracted through diethyl ether-water extractions using three 6 mL portions of diethyl ether. The diethyl ether fractions are pooled, dried with anhydrous Na$_2$SO$_4$ and filtered through a small column of Florisil™. The diethyl ether is removed in vacuo and the weighed residue dissolved in CDCl$_3$ for $^1$H-NMR and GC-MS analyses. The process as described gives 61% conversion and produces 3,3'-diethylbiphenyl (53%) and 2-thio-3,3'-diethylbiphenyl (8%), exclusively, as products.

Example 7

Method for Hydrodesulfurization of Dibenzothiophene Using In-Situ Derived [CoMe(NPEt$_3$)]$_4$PF$_6$ Catalyst The preparation of reaction mixture is conducted under an inert atmosphere, for example, in a nitrogen-filled dry box. A Teflon-sealed reactor is charged with 89 mg (0.48 mmol) dibenzothiophene, 13 mg (1.5×10$^{-2}$ mmol) [CoMe(NPEt$_3$)]$_4$, 1 mg (3.8×10$^{-3}$ mmol) Cp$_2$FePF$_6$, 77 mg (1.92 mmol) KH, 10 mL THF, and a stir bar. The reactor was taken out of the dry box and connected to a hydrogen manifold. The reaction vessel is then charged with H$_2$ (1 atm), employing strict inert-atmosphere laboratory techniques. The reaction mixture is then stirred at a 1200 rpm for 2 hours in an oil bath at 150° C.

The reactor is cooled to room and the reaction mixture quenched with a 10% HCl solution. The organic products are extracted through diethyl ether-water extractions using three 6 mL portions of diethyl ether. The diethyl ether fractions are pooled, dried with anhydrous Na$_2$SO$_4$ and filtered through a small column of Florisil™. The diethyl ether is removed in vacuo and the weighed residue dissolved in CDCl$_3$ for $^1$H-NMR and GC-MS analyses. The process as described gives 82% conversion and produces biphenyl (42%) and 2-phenylthiophenol (40%), exclusively, as products.

Example 8

Method for Hydrodesulfurization of 4,6-Diethyldibenzothiophene Using In-Situ Derived [CoMe(NPEt$_3$)]$_4$PF$_6$ Catalyst The preparation of reaction mixture is conducted under an inert atmosphere, for example, in a nitrogen-filled dry box. A Teflon-sealed reactor is charged with 57 mg (0.24 mmol) 4,6-diethyldibenzothiophene, 11 mg (1.3×10$^{-2}$ mmol) [CoMe(NPEt$_3$)]$_4$, 4 mg (1.2×10$^{-2}$ mmol) Cp$_2$FePF$_6$, 39 mg (0.96 mmol) KH, 10 mL THF, and a stir bar. The reactor was taken out of the dry box and connected to a hydrogen manifold. The reaction vessel is then charged with H$_2$ (1 atm), employing strict inert-atmosphere laboratory techniques. The reaction mixture is then stirred at a 1200 rpm for 1 hour in an oil bath at 150° C.

The reactor is cooled to room and the reaction mixture quenched with a 10% HCl solution. The organic products are extracted through diethyl ether-water extractions using three 6 mL portions of diethyl ether. The diethyl ether fractions are pooled, dried with anhydrous Na$_2$SO$_4$ and filtered through a small column of Florisil™. The diethyl ether is removed in vacuo and the weighed residue dissolved in CDCl$_3$ for $^1$H-NMR and GC-MS analyses. The process as described gives 41% conversion and produces 3,3'-diethylbiphenyl (29%) and 2-thio-3,3'-diethylbiphenyl (12%), exclusively, as products.

Example 9

Method for Hydrodesulfurization of Dibenzothiophene Using Purified [CoMe(NPEt$_3$)]$_4$PF$_6$ Catalyst The preparation of the reaction mixture is conducted under an inert atmosphere, for example, in a nitrogen-filled dry box. A Teflon-sealed reactor is charged with 135 mg (0.73 mmol) dibenzothiophene, 6 mg (6.6×10$^{-3}$ mmol) [CoMe(NPEt$_3$)]$_4$PF$_6$, 117 mg (2.92 mmol) KH, 10 mL THF, and a stir bar. The reactor was taken out of the dry box and connected to a hydrogen manifold. The reaction vessel is then charged with H$_2$ (1 atm), employing strict inert-atmosphere laboratory techniques. The reaction mixture is then stirred at a 1200 rpm for 1 hour in an oil bath at 110° C.

The reactor is cooled to room and the reaction mixture quenched with a 10% HCl solution. The organic products are extracted through diethyl ether-water extractions using three 6 mL portions of diethyl ether. The diethyl ether fractions are pooled, dried with anhydrous Na$_2$SO$_4$ and filtered through a small column of Florisil™. The diethyl ether is removed in vacuo and the weighed residue dissolved in CDCl$_3$ for $^1$H-NMR and GC-MS analyses. The process as described produces 3,3'-diethylbiphenyl (70%) and 2-thio-3,3'-diethylbiphenyl (30%), exclusively, as products.

Example 10

Method for Hydrodesulfurization of 4,6-Diethyldibenzothiophene Using Purified [CoMe(NPEt$_3$)]$_4$PF$_6$ Catalyst The preparation of the reaction mixture is conducted under an inert atmosphere, for example, in a nitrogen-filled dry box. A Teflon-sealed reactor is charged with 176 mg (0.73 mmol) 4,6-diethyldibenzothiophene, 6 mg (6.6×10$^{-3}$ mmol) [CoMe(NPEt$_3$)]$_4$PF$_6$, 117 mg (2.92 mmol) KH, 10 mL THF, and a stir bar. The reactor was taken out of the dry box and connected to a hydrogen manifold. The reaction vessel is then charged with H$_2$ (1 atm), employing strict inert-atmosphere laboratory techniques. The reaction mixture is then stirred at a 1200 rpm for 1.7 hours in an oil bath at 150° C.

The reactor is cooled to room and the reaction mixture quenched with a 10% HCl solution. The organic products are extracted through diethyl ether-water extractions using three 6 mL portions of diethyl ether. The diethyl ether fractions are pooled, dried with anhydrous $Na_2SO_4$ and filtered through a small column of Florisil™. The diethyl ether is removed in vacuo and the weighed residue dissolved in $CDCl_3$ for $^1$H-NMR and GC-MS analyses. The process as described produces 3,3'-diethylbiphenyl (50%) and 2-thio-3,3'-diethylbiphenyl (50%), exclusively, as products.

Example 11

Method for Hydrodesulfurization of Dibenzothiophene Using $[CoMe(NPEt_3)]_4PF_6$ Catalysts: $H_2S$ Scavenger Evaluations This is a general procedure employed in the examples below for the HDS of dibenzothiophene employing various $H_2S$ scavenging basic reagents.

The preparation of reaction mixtures is conducted under an inert atmosphere, for example, in a nitrogen-filled drybox 90 mg (0.49 mmol) dibenzothiophene, 4 mg (4.1× $10^{-3}$ mmol) $[CoMe(NPEt_3)]_4PF_6$ and 2.4 mmol of basic scavenger as indicated in Table 2, are mixed in THF (10 mL). The mixture is transferred into a medium-walled glass pressure reactor equipped with a Teflon magnetic stir bar. The reaction vessel is charged with $H_2$ (1 atm), employing strict inert-atmosphere laboratory techniques, and submerged in an oil bath on a heating magnetic stir plate, stirring at 1200 rpm at 140° C. for 16 hours.

The reactor is cooled to −35° C. and the reaction mixture quenched with a 10% HCl solution. The temperature of the reaction mixture is maintained at −35° C. and a fraction of the organic layer is pressed through a short Florisil™ column and submitted for GC-MS analysis. Table 2 shows some examples of $[CoMe(NPEt_3)]_4PF_6$-catalyzed dibenzothiophene HDS and the corresponding basic scavenger employed.

TABLE 2

Summary of HDS experiments of DBT catalyzed by $[CoMe(NPEt_3)]_4PF_6$ in THF employing different $H_2S$ scavenging reagents.

| | | % Conversion | | TON |
|---|---|---|---|---|
| Entry | Scavenger | Ar—H | Ar—SH | $\left(\frac{mol\ DBT}{mol\ Cat}\right)$ |
| 1 | LDA | 5.0 | 0.5 | 12.0 |
| 2 | KDA | 18.2 | 61.0 | 56.2 |
| 3 | LTMP | 3.9 | 0 | 8.1 |
| 4 | KTMP | 100 | 0 | 119.5 |
| 5 | NaH | 2.0 | 0.5 | 2.6 |
| 6 | KH | 100 | 0 | 119.5 |

In Table 2, turnover number (TON) equals moles of substrate converted per mol of $[CoMe(NPEt_3)]_4PF_6$. In cases wherein a mixture of the partially and fully-desulfurized products was obtained, one catalytic turnover was calculated as two moles of C—S bond activated per mole of cluster. The scavengers used were as follows: LDA (lithium diisopropyl amide); KDA (potassium diisopropyl amide); LTMP (lithium 2,2,6,6-tetramethylpipridide), NaH (sodium hydride) and KTMP (potassium 2,2,6,6-tetramethylpipridide).

Example 12

Method for Hydrodesulfurization of Dibenzothiophene Using $[CoMe(NPEt_3)]_4PF_6$ Catalysts: Turnover Frequency as a Function of Temperature This is a general procedure employed in the examples for the HDS of dibenzothiophene under varying temperature conditions, as shown below.

The preparation of reaction mixtures is conducted under an inert atmosphere, for example, in a nitrogen-filled drybox, 135 mg (0.73 mmol) dibenzothiophene, 1 mg (1.1×$10^{-3}$ mmol) $[CoMe(NPEt_3)]_4PF_6$ and 118 mg (2.93 mmol) potassium hydride, as indicated in Table 3, are mixed in THF (10 mL). The mixture is transferred into a medium-walled glass pressure reactor equipped with a Teflon magnetic stir bar. The reaction vessel is charged with $H_2$ (1 atm), employing strict inert-atmosphere laboratory techniques, and heated to the desired temperature in an oil bath on a heating magnetic stir plate, stirring at 1200 rpm.

After the indicated reaction time, the reaction mixture is cooled to room temperature and then quenched with a 10% HCl solution. The organic products are extracted through a series of diethyl ether-water extractions and the organic fractions are pooled, dried with anhydrous $Na_2SO_4$ and filtered through a small column of Florisil™. The solvent is removed in vacuo and the weighed residue is dissolved in $CDCl_3$ for $^1$H-NMR and GC-MS analyses. The percentage recovery (yield) of HDS products is determined by conducting experiments that have been allowed to proceed to completion.

Hydrogen pressures and temperatures employed in these reactions can vary over considerable range, which would be apparent to a person skilled in the art, based upon the teachings of this disclosure and the common general knowledge in the field of chemical catalysis. In all of the examples, one hydrogen at one atmosphere pressure is used. Optimal operating pressures will vary with catalyst, substrate, and process details, as is readily appreciated by those skilled in the art.

Table 3 shows some examples of $[CoMe(NPEt_3)]_4PF_6]$-catalyzed dibenzothiophene HDS and the corresponding process conditions employed. The examples are conducted using the general HDS procedure described above. Examples that proceeded to completion, exemplified by entry 1 and 4, gave isolated yields ranging from greater than 96% to quantitative.

TABLE 3

Summary of HDS experiments of DBT catalyzed by [CoMe(NPEt$_3$)]$_4$PF$_6$ in THF.[a]

| Entry | Temp (° C.) | Time (min) | % Conversion Ar—H | % Conversion Ar—SH | TOF[b] $\left(\frac{\text{mol DBT}}{\text{mol Cat} \cdot \text{min}}\right)$ |
|---|---|---|---|---|---|
| 1 | 130 | 120 | 100 | 0 | 5.5 |
| 2 | 150 | 40 | 75.2 | 24.8 | 14.5 |
| 3 | 165 | 30 | 78.5 | 21.5 | 19.8 |
| 4 | 182 | 12 | 100 | 0 | 55.3 |
| 5 | 200 | 6 | 47.9 | 46.2 | 78.6 |

The general reaction conditions: in a nitrogen-filled drybox, 135 mg (0.73 mmol) dibenzothiophene, 1 mg (1.1×10$^{-3}$ mmol) [CoMe(NPEt$_3$)]$_4$PF$_6$ and 118 mg (2.93 mmol) potassium hydride, are mixed in THF (10 mL). The mixture is transferred into a medium-walled glass pressure reactor equipped with a Teflon magnetic stir bar. The reaction vessel is charged with H$_2$ (1 atm), employing strict inert-atmosphere laboratory techniques, and heated to the desired temperature in an oil bath on a heating magnetic stir plate, stirring at 1200 rpm for the allotted time.

The turnover frequency (TOF) was measured as moles of substrate converted per mol of [CoMe(NPEt$_3$)]$_4$PF$_6$ per minute; in cases wherein a mixture of the partially and fully-desulfurized products was obtained, one catalytic turnover was calculated as two moles of C—S bond activated per mole of cluster per hour.

Example 13

Method for Hydrodesulfurization of Benzothiophene Using [CoMe(NPEt$_3$)]$_4$PF$_6$ Catalyst The preparation of the reaction mixture is conducted under an inert atmosphere, for example, in a nitrogen-filled dry box. A Teflon-sealed reactor is charged with 100 mg (0.75 mmol) benzothiophene, 1 mg (1.1×10$^{-3}$ mmol) [CoMe(NPEt$_3$)]$_4$PF$_6$, 60 mg (3.00 mmol) KH, 10 mL THF, and a stir bar. The reactor was taken out of the dry box and connected to a hydrogen manifold. The reaction vessel is then charged with H$_2$ (1 atm), employing strict inert-atmosphere laboratory techniques. The reaction mixture is then stirred at a 1200 rpm for 2.7 hours in an oil bath at 150° C. The reactor is cooled to −35° C. and the reaction mixture quenched with a 10% HCl solution. The temperature of the reaction mixture is maintained at −35° C. and a fraction of the organic layer is filtered through a short Florisil™ column and submitted for GC-MS analysis. GC retention times and EIMS M$^+$ values corresponding to HDS products of chemical formula: C$_8$H$_{10}$ (ethylbenzene) and C$_{16}$H$_{20}$ (dimerized ethylbenzene) in 18% and 57% yields, respectively. The products obtained under these reaction conditions result from catalytic hydrogenation of unsaturated hydrocarbons in addition to the hydrodesulfurization process.

Example 14

Method for Hydrodesulfurization of an Alkyl-Substituted Thiophene Using [CoMe(NPEt$_3$)]$_4$PF$_6$ Catalysts The preparation of the reaction mixture is conducted under an inert atmosphere, for example, in a nitrogen-filled dry box. A Teflon-sealed reactor is charged with a stir bar, 85.0 mg (0.51 mmol) 3-hexylthiophene, 1 mg (1.1×10$^{-3}$ mmol) [CoMe(NPEt$_3$)]$_4$PF$_6$, 81.8 mg (2.04 mmol) KH and 10 mL THF. The reactor is then taken out of the dry box and connected to a hydrogen manifold. The reaction vessel is then charged with H$_2$ (1 atm), employing strict inert-atmosphere laboratory techniques. The reaction mixture is stirred vigorously at 1200 rpm for 3.5 hours in an oil bath at 190° C.

The reactor is cooled to −35° C. and the reaction mixture quenched with a 10% HCl solution. The temperature of the reaction mixture is maintained at −35° C. and a fraction of the organic layer is filtered through a short Florisil™ column and submitted for GC-MS analysis. GC retention times and EIMS M$^+$ values corresponding to the HDS products of chemical formula C$_{10}$H$_{18}$ exclusively.

Example 15

Method for Hydrodesulfurization of Diphenyl Sulfide Using [CoMe(NPEt$_3$)]$_4$PF$_6$ Catalysts The preparation of the reaction mixture is conducted under an inert atmosphere, for example, in a nitrogen-filled dry box. A Teflon-sealed reactor is charged with 119 mg (0.64 mmol) diphenylsulfide, 1 mg (1.1×10$^{-3}$ mmol) [CoMe(NPEt$_3$)]$_4$PF$_6$, 103 mg (2.56 mmol) KH, 10 mL THF, and a stir bar. The reactor was taken out of the dry box and connected to a hydrogen manifold. The reaction vessel is then charged with H$_2$ (1 atm), employing strict inert-atmosphere laboratory techniques. The reaction mixture is then stirred at a 1200 rpm for 3.2 hours in an oil bath at 120° C.

The reactor is cooled to −35° C. and the reaction mixture quenched with a 10% HCl solution. The temperature of the reaction mixture is maintained at −35° C. and a fraction of the organic layer is filtered through a short Florisil™ column and submitted for GC-MS analysis. GC retention times and EIMS M$^+$ values corresponding to HDS products of chemical formula: C$_6$H$_6$ (benzene) and C$_{12}$H$_{10}$ (biphenyl) in 56% and 28% yields, respectively.

Example 16

Method for Hydrodesulfurization of Dialkyl Thioethers Using [CoMe(NPEt$_3$)]$_4$PF$_6$ Catalysts The preparation of the reaction mixture is conducted under an inert atmosphere, for example, in a nitrogen-filled dry box. A Teflon-sealed reactor is charged with 192 mg (0.52 mmol) dodecyl sulfide, 1 mg (1.1×10$^{-3}$ mmol) [CoMe(NPEt$_3$)]$_4$, 84 mg (2.1 mmol) KH, a magnetic stir bar, and 10 mL THF. The reactor is taken out of the dry box and connected to a hydrogen manifold. The reaction vessel is then charged with H$_2$ (1 atm), employing strict inert-atmosphere laboratory techniques. The reaction mixture is then stirred at 1200 rpm for 1.9 hours in an oil bath at 110° C.

The reactor is cooled to −35° C. and the reaction mixture quenched with a 10% HCl solution. The temperature of the reaction mixture is maintained at −35° C. and a fraction of the organic layer is filtered through a short Florisil™ column and submitted for GC-MS analysis. GC retention times and EIMS M$^+$ values corresponding to HDS products of chemical formula: C$_{12}$H$_{26}$ (dodecane), C$_{12}$H$_{24}$ (dodecene), and C$_{12}$H$_{26}$S (dodecanethiol) in 35%, 4%, and 31% yields respectively.

Example 17

Method for Hydrodesulfurization of Alkyl Aryl Thioethers Using [CoMe(NPEt$_3$)]$_4$PF$_6$ Catalysts The preparation of the reaction mixture is conducted under an inert atmosphere, for example, in a nitrogen-filled dry box. A Teflon-sealed reactor is charged with 165 mg (0.82 mmol) benzyl phenyl sulfide, 1 mg (1.1×10$^{-3}$ mmol) [CoMe(NPEt$_3$)]$_4$PF$_6$, 40 mg (132 mmol) KH, a Teflon magnetic stir bar, and 10 mL THF. The reactor is taken out of the dry box and connected to a hydrogen manifold. The reaction vessel is then charged with H$_2$ (1 atm), employing strict inert-atmosphere laboratory techniques. The reaction mixture is then stirred at 1200 rpm for 2.2 hours in an oil bath at 120° C.

The reactor is cooled to –35° C. and the reaction mixture quenched with a 10% HCl solution. The temperature of the reaction mixture is maintained at –35° C. and a fraction of the organic layer is filtered through a short Florisil™ column and submitted for GC-MS analysis. GC retention times and EIMS M$^+$ values corresponding to HDS products of chemical formula: C$_7$H$_8$ (toluene), C$_6$H$_6$S (benzenethiol), and C$_{13}$H$_{12}$ (diphenylmethane) in 18%, 12%, and 40% yields respectively.

Example 18

Method for Hydrodesulfurization of p-Tolyldisulfide Using [CoMe(NPEt$_3$)]$_4$PF$_6$ Catalysts The preparation of the reaction mixture is conducted under an inert atmosphere, for example, in a nitrogen-filled dry box. A Teflon-sealed reactor is charged with 150 mg (0.61 mmol) p-tolyldisulfide, 1 mg (1.1×10$^{-3}$ mmol) [CoMe(NPEt$_3$)]$_4$PF$_6$, 60 mg (2.44 mmol) KH, 10 mL THF, and a stir bar. The reactor was taken out of the dry box and connected to a hydrogen manifold. The reaction vessel is then charged with H$_2$ (1 atm), employing strict inert-atmosphere laboratory techniques. The reaction mixture is then stirred at a 1200 rpm for 2.7 hours in an oil bath at 170° C.

The reactor is cooled to –35° C. and the reaction mixture quenched with a 10% HCl solution. The temperature of the reaction mixture is maintained at –35° C. and a fraction of the organic layer is filtered through a short Florisil™ column and submitted for GC-MS analysis. GC retention times and EIMS M$^+$ values corresponding to HDS products of chemical formula: C$_7$H$_8$ (toluene) and C$_7$H$_8$S (toluene thiol) in 17% and 61% yields, respectively.

Example 19

Method for Hydrodesulfurization of Phenoxathiin Using [CoMe(NPEt$_3$)]$_4$PF$_6$ Catalysts The preparation of the reaction mixture is conducted under an inert atmosphere, for example, in a nitrogen-filled dry box. A Teflon-sealed reactor is charged with 118 mg (0.59 mmol) phenoxathiin, 1 mg (1.0×10$^{-3}$ mmol) [CoMe(NPEt$_3$)]$_4$PF$_6$, 94.7 mg (2.36 mmol) KH, a Teflon magnetic stir bar, and 10 mL THF. The reactor is then taken out of the dry box and connected to a hydrogen manifold. The reaction vessel is then charged with H$_2$ (1 atm), employing rigorous inert-atmosphere laboratory techniques. The reaction mixture is then stirred at 1200 rpm for 13 hours in an oil bath at 150° C.

The reactor is cooled to –35° C. and the reaction mixture quenched with a 10% HCl solution. The temperature of the reaction mixture is maintained at –35° C. and a fraction of the organic layer is filtered through a short Florisil™ column and submitted for GC-MS analysis. GC retention times and EIMS M$^+$ values corresponding to HDS products of chemical formula: C$_6$H$_6$ (benzene), C$_6$H$_7$O (phenol), C$_{12}$H$_{10}$ (biphenyl), and C$_{12}$H$_{10}$O (2-phenylphenol) in 27%, 13%, 14%, and 46% yields respectively.

The invention claimed is:

1. A method of catalyzing a hydrodesulfurization reaction comprising:
reacting an organic substrate having at least one carbon-sulfur bond in the presence of a reducing agent with a catalyst of general formula:

$$\{[\text{A-M}(\text{NPR}_3)]_n\}^{m+}(Y^{d-})_e \qquad \text{Formula I}$$

where:
A is a monoanionic σ-bonded ligand capable of undergoing hydrogenolysis in the presence of hydrogen or hydrosilane;
M is Fe, Ni or Co;
n equals 2, 3, or 4;
m equals 0, 1, 2, 3, or 4;
Y is a weakly-coordinating or non-coordinating counterion, of formal negative charge 'd', and with stoichiometry 'e' such that d·e=m, and
NPR$_3$ is an anionic phosphoranimide ligand of structure:

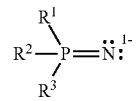

where:
R$^1$, R$^2$, R$^3$ can be the same group or different groups selected from: C$_{1-18}$ primary, secondary, or tertiary alkyl, a C$_{3-8}$ cycloalkyl, aryl, heteroaryl, substituted aryl, substituted heteroaryl, or an inert functional group containing at least one heteroatom selected from the group consisting of a Group 15 element, a Group 16 element, silicon, and combinations thereof;
wherein R$^1$, R$^2$, R$^3$ may also be linked to give cyclic systems; and
wherein the ratio of M to NPR$_3^-$ in the catalyst is 1:1.

2. The method of claim 1, wherein the substrate is a dibenzothiphene or a derivative thereof, a thiophene or a derivative thereof, benzothiophene or a derivative thereof, or a sulfur ether or a derivative thereof.

3. The method of claim 1, wherein A in the catalyst of Formula I is a hydrocarbyl, a thiolate, or an alkoxide.

4. The method of claim 1, wherein A is methyl.

5. The method of claim 1, wherein the reducing agent is hydrogen or an organic silyl hydride.

6. The method of claim 1, wherein the method is carried out at a reaction temperature between about 90° C. to about 300° C.

7. The method of claim 1, wherein the reaction is carried out at a reaction temperature of about 110° C. to 230° C.

8. The method of claim 1, wherein NPR$_3$ in the catalyst of Formula I is NPEt$_3$ or NPt-butyl.

9. The method of claim 1, wherein the catalyst of Formula I is [MeCo(NPEt$_3$)]$_4$.

10. The method of claim 1, wherein the catalyst of Formula I is [MeCo(NPEt$_3$)]$_4$PF$_6$.

11. The method of claim 1, wherein the catalyst of Formula I is [MeFe(NP'Bu$_3$)]$_2$.

12. The method of claim 1, wherein the catalyst of Formula I is [MeNi(NPEt$_3$)]$_4$.

13. The method of claim 1, wherein the catalyst of Formula I is FeMe(NP'Bu$_3$)]$_2$PF$_6$ or [FeMe(NP'Bu$_3$)]$_2$(PF$_6$)$_2$.

14. The method of claim 1, further comprising carrying out the reaction in the presence of a Group I or a Group II metal hydride.

15. The method of claim 14, wherein the reaction is carried out in toluene or tetrahydrofuran.

16. The method of claim 14, wherein in the catalyst of Formula I, m=0 and thereby, there is no $(Y^{d-})$e.

17. The method of claim 1, wherein the ratio of catalyst to substrate is about 1:1 to about 1:1000.

18. The method of claim 1, additionally comprising catalyzing the hydrogenation of a carbon-carbon unsaturated bond in the substrate, the carbon-carbon bond not being present in an aromatic ring on the substrate.

19. A method of catalyzing the hydrodesulfurization of an organic substrate having at least one carbon-sulfur bond, the method comprising:
    reacting an outer sphere oxidant with a compound of Formula II in the presence of the organic substrate to obtain a compound of Formula I;
    adding a reducing agent selected from the group consisting of a silyl hydride and hydrogen;
    allowing the reaction to proceed until the organic substrate is at least partially desulfurized,
    wherein the compound of Formula I is:

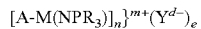

where A is a monoanionic σ-bonded ligand capable of undergoing hydrogenolysis in the presence of hydrogen or hydrosilane;
M is Fe, Co or Ni;
n equals 2, 3, or 4;
m equals 0, 1, 2, 3, or 4;
Y is a weakly-coordinating or non-coordinating counter-ion, of formal negative charge 'd', and with stoichiometry 'e' such that d·e=m;
NPR$_3$ is an anionic phosphoranimide ligand of structure:

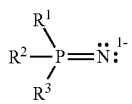

where:
R$^1$, R$^2$, R$^3$ can be the same group or different groups selected from:
C$_{1-18}$ primary, secondary, or tertiary alkyl, C$_{3-8}$ cycloalkyl, aryl, heteroaryl, substituted aryl, substituted heteroaryl, or an inert functional group containing at least one heteroatom selected from the group consisting of a Group 15 element, a Group 16 element, silicon, and combinations thereof;
R$^1$, R$^2$, R$^3$ may also be linked to give cyclic systems; and
wherein the ratio of M to NPR$_3^-$ is 1:1, and
wherein the compound of Formula II is [A-M(NPR$_3$)]$_n$, where A, M, n and NPR$_3$ are defined as in the compound of Formula I.

20. The method of claim 19, wherein the outer sphere oxidant is a ferrocenium, silver(I), copper(II), Fe(III), or Ce(IV) salt), [IrCl$_6$]$_2$, [PtCl$_6$]$_2^-$, [Ni(tfd)$_2$], [Mo(tfd)$_3$]), a halogen, a nitrosonium salt, [N(aryl)$_3$]$^+$, a thianthrene, a trityl salt, a tropylium salt or a quinone derivative.

21. The method of claim 19, wherein the substrate is selected from the group consisting of dibenzothiophene or a derivative thereof, thiophene or a derivative thereof, benzothiophene or a derivative thereof, and a sulfur ether or a derivative thereof.

22. The method of claim 19, wherein A in the compound of Formula I is a hydrocarbyl, a thiolate, or an alkoxide.

23. The method of claim 19, wherein the compound of Formula I is [MeCo(NPEt$_3$)]$_4$, [MeCo(NPEt$_3$)]$_4$PF$_6$, [MeFe(NP'Bu$_3$)]$_2$, [NiMe(NP'Bu$_3$)]$_4$, FeMe(NP'Bu$_3$)]$_2$PF$_6$ or [FeMe(NP'Bu$_3$)]$_2$(PF$_6$)$_2$.

24. A method of catalyzing a hydrogenation reaction comprising:
    reacting an organic substrate having at least one unsaturated carbon bond, the carbon-carbon unsaturated bond not being present in an aromatic ring, in the presence of a reducing agent with a catalyst having a formula:

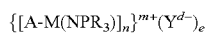

wherein:
A is a monoanionic σ-bonded ligand capable of undergoing hydrogenolysis in the presence of hydrogen or hydrosilane;
M is Fe, Ni or Co;
n equals 2, 3, or 4;
m equals 0, 1, 2, 3, or 4;
Y is a weakly-coordinating or non-coordinating counter-ion, of formal negative charge 'd', and with stoichiometry 'e' such that d·e=m, and
NPR$_3$ is an anionic phosphoranimide ligand of structure:

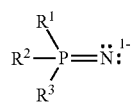

wherein:
R$^1$, R$^2$, R$^3$ can be the same or different groups selected from: C$_{1-18}$ primary, secondary, or tertiary alkyl; a C$_{3-8}$ cycloalkyl, aryl; heteroaryl; substituted aryl; substituted heteroaryl; an inert functional group containing at least one heteroatom selected from the group consisting of a Group 15 element, a Group 16 element, silicon, and combinations thereof; and
R$^1$, R$^2$, R$^3$ may be linked to give cyclic systems; and
wherein the ratio of M to NPR$_3^-$ in the catalyst is 1:1.

25. The method of claim 24, wherein the catalyst of Formula I is [MeCo(NPEt$_3$)]$_4$, [MeCo(NPEt$_3$)]$_4$PF$_6$, [MeFe(NP'Bu$_3$)]$_2$, [NiMe(NP'Bu$_3$)]$_4$, FeMe(NP'Bu$_3$)]$_2$PF$_6$ or [FeMe(NP'Bu$_3$)]$_2$(PF$_6$)$_2$.

26. The method of claim 24, wherein the method further comprises catalyzing the desulfurization of a carbon-sulfur bond in the substrate.

27. The method of claim 24, wherein the reducing agent is hydrogen or an organic silyl hydride.

28. A method of catalyzing a hydrodesulfurization reaction comprising:
    reacting a compound having the formula (MNPR$_3$)$_n$X$_m$ with a nucleophilic reagent having the formula AM' in a reducing environment, in the presence of a substrate containing at least one carbon-sulfur bond, according to the reaction:

wherein
- A is a monoanionic σ-bonded ligand capable of undergoing hydrogenolysis in the presence of hydrogen or hydrosilane
- M' is alkali or alkaline earth metal, or a Group 13 reagent;
- X is a halide or pseudohalide;
- n is 2, 3, or 4;
- m is 0, 1, 2, 3, or 4;
- M is Fe, Ni or Co;
- $NPR_3$ is an anionic phosphoranimide ligand of structure:

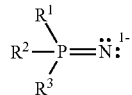

wherein:
- $R^1$, $R^2$, and $R^3$ are the same or different groups selected from: a $C_{1-18}$ primary, secondary, or tertiary alkyl; a $C_{3-8}$ cycloalkyl; aryl; heteroaryl; substituted aryl; substituted heteroaryl; an inert functional group containing at least one heteroatom selected from the group consisting of a Group 15 element, a Group 16 element, silicon, and combinations thereof; and
- $R^1$, $R^2$, $R^3$ may be linked as cyclic systems; and
the ratio of M to $NPR_3^-$ is 1:1.

* * * * *